United States Patent

Foerster

[15] 3,656,115

[45] Apr. 11, 1972

[54] FUSIBLE LINK MATRIX FOR PROGRAMMABLE NETWORKS

[72] Inventor: Roy P. Foerster, Thousand Oaks, Calif.

[73] Assignee: The Bunker-Ramo Corporation, Canoga Park, Calif.

[22] Filed: Apr. 19, 1971

[21] Appl. No.: 135,356

Related U.S. Application Data

[63] Continuation of Ser. No. 728,684, May 13, 1968, abandoned.

[52] U.S. Cl. ....................340/166 R

[51] Int. Cl. ....................H04q 9/00

[58] Field of Search....................340/166, 173

[56] References Cited

UNITED STATES PATENTS

| | | | |
|---|---|---|---|
| 3,028,659 | 4/1962 | Chow et al. | 340/166 X |
| 3,179,947 | 4/1965 | Crystal et al. | 340/166 X |
| 3,191,151 | 6/1965 | Price | 340/176 X |
| 3,230,355 | 1/1966 | Chu | 340/166 X |
| 3,337,849 | 8/1967 | Lowry | 340/166 |

OTHER PUBLICATIONS

IBM Technical Disclosure Bulletin– " Memory Array" Dewitt et al. Vol. 10 No. 1, June 1967

*Primary Examiner*—Donald J. Yusko
*Attorney*—Frederick M. Arbuckle

[57] ABSTRACT

A fusible link matrix is provided to enable a parameter (e.g., resistance) of a module to be adjusted, without requiring physical access to the components thereof, by selectively fusing (opening or closing) links of the matrix through an addressing bus. Decoupling diodes between the fusible links and lines of the bus prevent sneak current paths.

3 Claims, 4 Drawing Figures

INVENTOR
ROY P. FOERSTER
BY Lindenberg + Freilich
ATTORNEYS

INVENTOR
ROY P. FOERSTER
BY Lindenberg + Freilich
ATTORNEYS

FUSIBLE LINK MATRIX FOR PROGRAMMABLE NETWORKS

CROSS REFERENCE

This application is a continuation of application Ser. No. 728,684 filed May 13, 1968, now abandoned.

The invention described herein was made in the performance of work under a NASA contract and is subject to the provisions of section 305 of the National Aeronautics and Space Act of 1958, Public Law 85-568 (72 Stat. 435, 42 U.S.C. 2457).

BACKGROUND OF THE INVENTION

1. Field of the Invention

This invention relates to programmable circuit modules and in particular to a fusible link matrix through which a circuit module is given the capability of being modified with respect to a particular parameter without requiring physical access to the components thereof.

2. Description of the Prior Art

It is frequently necessary or desirable to fabricate circuit modules, such as integrated circuit modules, in a given configuration and then to alter or modify each module in accordance with its particular environment or operating requirements in a system. In the past, this has been done by bringing internal connections out to terminals on the modules. The specialization required was then done by adding external circuits to the module. In the simplest case, all of the components necessary to specialize a module were provided on the module itself. The external circuits required were then simply external, low impedance conductors or jumpers.

For example, in threshold logic systems, it is desirable to have a standard threshold logic element having precision thin-film resistors forming an input summation network and providing a voltage divider for establishing the desired threshold reference level. The input signals to the summation networks are derived from a common voltage source, and the desired threshold level is set by connecting the voltage divider across this source. However, since each threshold logic element is required to operate in a particular manner depending upon its environment or use in the threshold logic system, it is necessary to modify the voltage divider for each threshold logic element to establish its particular desired threshold reference level.

It would not be unusual to have, for example, as many as seven threshold logic elements in one module such that it would be necessary to set each of seven internal precision resistors to one of fifteen possible values. Assuming each internal precision resistor can be defined by one or more of four fixed resistors connected in parallel, the use of terminal jumpers would require four terminal jumpers for each of the seven modules. Thus, the use of terminal jumpers would require 28 additional external terminals on the circuit module. That is not practical.

OBJECTS AND SUMMARY OF THE INVENTION

A primary object of the present invention is to provide a system for adjusting a parameter of a circuit.

Briefly, in accordance with the present invention, groups of circuit components are provided, each group being comprised of a plurality of interconnected components (e.g., resistors). A different group is provided for each circuit parameter to be adjusted. A fusible link is connected in series or in parallel with each component, and all fusible links have one end connected to a first terminal which serves as a discrete address for the group. A bus having a separate line for each fusible link of a given group is provided such that each line of the bus is connected to the other end of a fusible link in each group. By selectively burning out (i.e., opening or closing) links through the addressing bus, components are selectively added or removed to adjust a parameter. A unidirectional conducting device connected between each fusible link and a bus line prevents sneak current paths between groups. To modify a given circuit parameter, sufficient momentary power is applied to selected ones of the bus lines and the first terminal associated with the group of fusible links connected to components provided for that circuit parameter. Each circuit parameter may be in a separate functional circuit on a module. In the various preferred embodiments, fusible links are disclosed and described of the type which present a short circuit until burned out, and of the type which present an open circuit until burned out and then a short circuit. Accordingly, the term "fusible link" is to be regarded as generic to both types of such devices.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
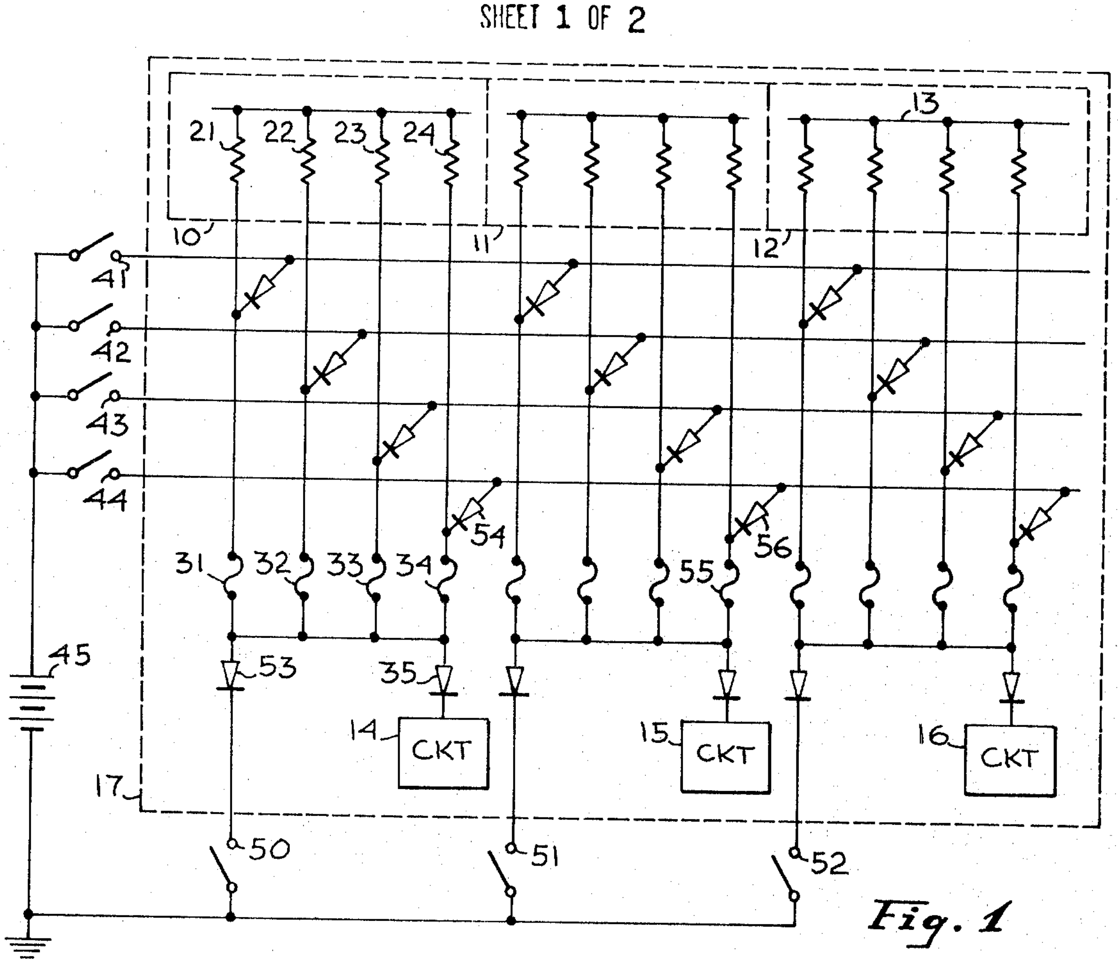
FIG. 1 is a schematic diagram of a fusible link matrix for providing selected ones of a plurality of resistors in parallel by groups.

Referring now to FIG. 1, groups 10, 11, and 12 of four resistors each are shown connected between conductor, such as conductor 13 for group 12, and respective circuits 14, 15, and 16 of a module 17. Each resistor of groups 10 and 11, such as resistors 21, 22, 23, and 24 of the group 10, is connected to its circuit through fusible links and a decoupling diode such as the links 31, 32, 33, and 34 of a first type (commonly referred to as fuses) associated with the resistors 21, 22, 23, and 24, and the decoupling diode 35 associated with the circuit 14.

The four resistors of each group 10, 11, and 12 may be weighted in a binary progression so that combinations of the resistors may be employed to realize any of 15 different values of resistance. In that manner, the parameter provided by a group of resistors for its circuit may be selectively altered without having physical access to the resistors, such as when they are provided in integrated circuit modules. That is accomplished by selectively fusing links with current provided by a bus consisting of four lines connected to terminals 41, 42, 43, and 44. Thus, to increase the total equivalent resistance of a group, such as the group of resistors 10 connected to the circuit 14, the group 10 is selected from all other groups by connecting terminal 50 associated therewith to, for example, ground or the negative terminal of a power supply 45. Undesired resistors are then removed by applying a positive potential from that power supply to selected terminals 41 through 44. If all groups of resistors 10, 11, and 12 are to be altered in the same manner, terminals 51 and 52 associated with the groups 11 and 12 would also be connected to ground while a positive potential is applied to selective terminals 41 through 44.

While switches are shown, it should be understood that the selective connections to external terminals 41 to 44 and 50 to 52 of the module 17 may be made in any convenient manner, as by "alligator" clips.

Each of the terminals 50, 51, and 52 is connected to its associated group of resistors by a decoupling diode and the fusible links, such as a decoupling diode 53 and fusible links 31 through 34 associated with resistors 21 through 24 of the group 10.

Assuming that the resistors 21, 22, 23 and 24 are weighted in a binary progression, as suggested hereinbefore, such that the resistance values required of the group are R/1, R/2...R/8, where R may be for example 150,000 ohms, the resistance value initially set is R/15 because all resistors are connected in parallel. The total equivalent resistance of the group 10 may then be increased to, for example, R/5, by blowing fusible links 32 and 34 connected in series with resistors 22 and 24 having resistance values R/2 and R/8 respectively.

Fusible link 34 can be selectively burned out by passing through it a current of sufficient amplitude (such as 35 milliamperes) from the source 45 when connected to the terminals 44 and 50. In normal operation the current through the links is only a few milliamperes. Therefore, there is no danger of the links blowing during normal operation of the associated circuit 14. Thus, a group of resistors is selected through terminals 50, 51, and 52, which collectively may be referred to as one addressing bus consisting of three lines to which those terminals are connected, and within each group selected, the total resistance of the group may be altered by selectively burning out fusible links through terminals 41 through 44 connected to a second addressing bus consisting of four lines, one for each of the four fusible links connected in series with the four resistors of the group. Consequently, only these addressing buses are required to be connected to external terminals on the circuit module 17.

With only three distinct circuits on the module 17, only seven external connections are required. In a typical module, as many as seven circuits would be provided but that would only add four terminals, one for each of the additional circuits corresponding to the terminals 50, 51, and 52 for the circuits 14, 15, and 16. The one addressing bus connected to terminals 41, 42, 43, and 44 is common to all of the circuits regardless of how many are provided. In other words, for the addressing bus consisting of lines connected to terminals 50, 51, and 52, an additional line is added for each circuit added to the module, but the bus consisting of lines connected to terminals 41, 42, 43, and 44 will remain the same regardless of the number of circuits included in the module.

If the group-addressing terminals 50, 51, and 52 are input terminals for the circuits 14, 15, and 16, then it may be said that only four extra terminals are required for the addressing bus consisting of the four lines connected to all groups, namely terminals 41, 42, 43, and 44. But in either case, the number of additional external terminals required on the module is greatly decreased by the use of fusible links in accordance with the present invention.

Each of the bus lines connected to terminals 41, 42, 43, and 44 is coupled to the second terminal of a fusible link by an isolating diode, such as an isolating diode 54 connected to the second terminal of the fusible link 34. Such decoupling diodes prevent sneak current paths from one resistor matrix to another. For instance, assuming that the supply bus 13 is connected to a source of positive potential, diode 54 will prevent current from the junction between resistor 24 and fusible link 34 from flowing through a fusible link 55 connected to the circuit 15. If the supply bus 13 is connected to a source of negative potential, the diode 54 will be forward biased and therefore will conduct current onto the bus line connected to the terminal 44. However, current will not flow through the fusible link 55 to the circuit 15 because of the decoupling diode 56 connected to the second terminal of the fusible link 55. Thus, by connecting the second terminal of each fusible link to its addressing bus line by a unidirectional conducting device, sneak current paths are prevented between circuits on the module through the addressing bus lines. Is is to be understood, of course, that the power supply connected to the module to selectively blow links is disconnected entirely during normal operation of the circuits on the module.

Although the present invention has been described in one preferred embodiment as shown in FIG. 1, it should be appreciated that many variations and modifications may be made to meet particular applications and operating requirements. For example, decoupling diodes 35 and 53 associated with the circuit 14 may not be necessary in some applications depending upon the particular operating requirements of the circuit 14.

Figure 2:
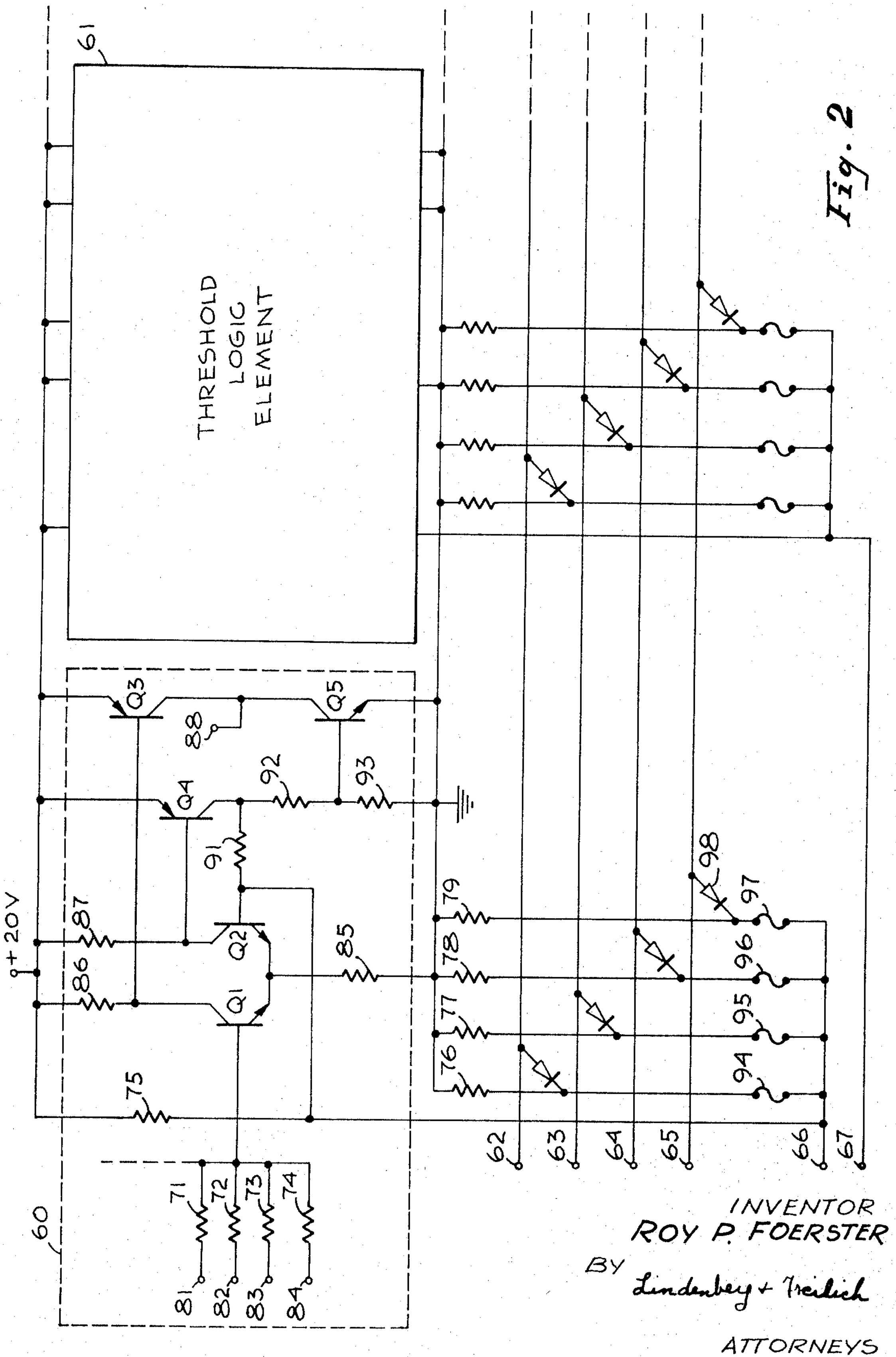
FIG. 2 is a schematic diagram of a modified embodiment of the present invention in an illustrative environment.

A second embodiment of the present invention will now be described with reference to FIG. 2 wherein the circuits of a module are all identical threshold logic elements. Only two circuits 60 and 61 are shown, but, as with the first embodiment illustrated in FIG. 1, any number of circuits may be added without increasing the number of terminals 62 through 65 connected to a first addressing bus and adding only one terminal for each circuit added connected to a second addressing bus similar to terminals 66 and 67 associated with the circuits 60 and 61, respectively.

The threshold logic element 60 consists of precision, thin-film resistors 71 through 74 which form an input summing network, and precision, thin-film resistors 75 through 79 which form a voltage divider for establishing the desired threshold reference level. Input signals to the summing network are derived from a common voltage source, and the desired threshold level is set by connecting the voltage divider across that source, shown as a +20-volt power supply. In that manner, both the summation result and the threshold level maintain a constant proportionality relationship with variations in the voltage level of the source, thereby obviating the need for regulation of the various signal input levels and the threshold reference level since any shift in the voltage of the common source is reflected as a proportionate shift in both the threshold reference level and the various signal input levels.

The sum of the various input signals at terminals 81, 82, 83, and 84 is compared with the threshold level by means of a differential amplifier comprising NPN transistors $Q_1$ and $Q_2$ each having its emitter connected to a source of reference potential or ground through a common resistor 85. In order to maximize the advantages gained through the use of precision, thin-film resistors, the transistors $Q_1$ and $Q_2$ are matched, i.e., selected to have substantially the same gain.

Outputs from the differential amplifier taken across resistors 86 and 87 in the collector circuits of the transistors $Q_1$ and $Q_2$ are connected to PNP transistors $Q_3$ and $Q_4$ to connect an output terminal 88 either to ground (through NPN transistor $Q_5$) or to the positive power supply, depending upon the result of the comparison between the sum of the various signal inputs at terminals 81 through 84 and the threshold reference voltage at the base of the transistor $Q_2$ provided by the voltage dividing network consisting of resistor 75 in series with a group of parallel connected resistors 76 through 79. Thus, the magnitude of the output signal at terminal 88 varies substantially between 0 and +20 volts. This is so because while transistor $Q_1$ is on, due to the sum of the input signals at terminals 81 through 84, transistor $Q_3$ is also on, but both transistors $Q_2$ and $Q_4$ are turned off. With transistor $Q_4$ turned off, the transistor $Q_5$ is turned off by a bias voltage provided by voltage dividing network consisting of resistors 91, 92, and 93 connected to the base of the transistor $Q_2$. When the transistor $Q_1$ is turned off and the transistor $Q_2$ is turned on, the transistor $Q_3$ is turned off and the output terminal 88 is clamped to substantially ground by the transistor $Q_5$ which is turned on by the transistor $Q_4$.

To set the desired threshold reference level for a given logic element, such as the threshold logic element 60, selected ones of the parallel connected resistors 76, 77, 78, and 79 are effectively removed by burning out associated ones of respective fusible links 94, 95, 96, and 97. That is done by connecting the input terminal 66 of the group of resistors to be adjusted to ground, while selected terminals 62, 63, 64, and 65 associated with the undesired resistors of the group are connected to the positive terminal of a power supply. In that manner, current which is limited to about 35 to 50 milliamperes is conducted through the fusible links which are connected in series with the undesired resistors. Since current of that amplitude will blow the fusible links, the undesired resistors connected in series therewith will be effectively removed from the voltage dividing network of the threshold logic element 60.

The threshold reference level is set in the same manner for each of the remaining threshold logic elements on the module such as the threshold logic element 61. If all of the threhold logic elements are to be set with the same reference level, all of the discrete logic-element-addressing terminals, such as terminals 66 and 67, may be connected to the negative terminal of a power supply at the same time while the positive terminal is connected to selected ones of the terminals 62 through 65. Otherwise, each logic element is addressed individually. Once all of the threshold reference levels have been set for the various logic elements, all of the addressing terminals are disconnected from the power supply.

As in the first preferred embodiment, diodes connect lines of the addressing bus connected to terminals 62 through 65 to the second terminal of respective fusible links such as fusible links 94 through 97 associated with the group of resistors 76 through 79 and the voltage dividing network of the first logic element 60. Again, as before, each unidirectional conducting device such as diode 98 blocks any sneak current path which the addressing bus connected to terminals 62 through 65 would otherwise provide to other threshold logic elements.

Figure 3:
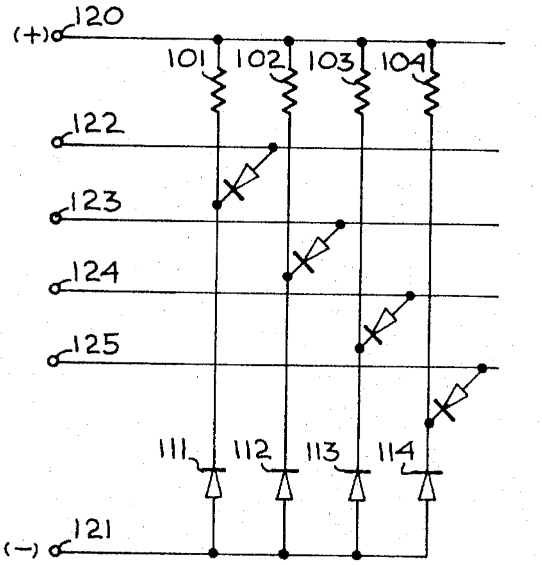
FIGS. 3 and 4 illustrate other embodiments of the present invention.
Figure 4:
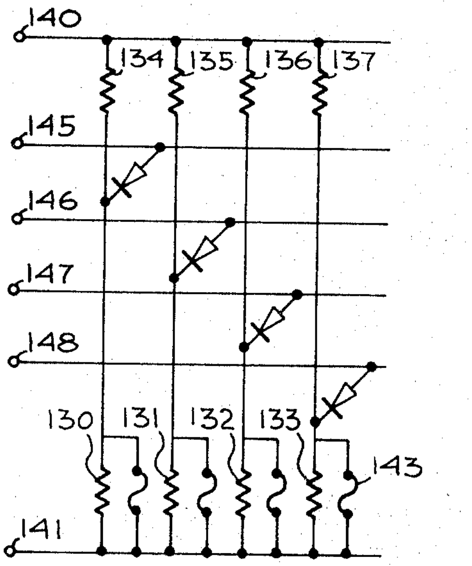

Referring now to FIGS. 3 and 4, other embodiments of the present invention are illustrated. In FIG. 3, each of a plurality of resistors 101 to 104 is connected in series with a different one of a plurality of fusible links of a second type such as junction diodes 111 to 114 between two terminals 120 and 121. A circuit (not shown) is so connected that in normal operation terminal 120 is positive with respect to terminal 121 to reverse bias the diodes 111 to 114 below their known reverse breakdown voltage. In that manner, all of the resistors 101 to 104 are effectively out of the circuit and a very high (virtually open circuit) resistance is present between terminals 120 and 121. To adjust that resistance to a predetermined lower value, selected diodes 111 to 114 are burned out by a larger (greater than reverse breakdown) positive voltage momentarily applied between terminal 121 and selected terminals 122 to 125. Once a selected diode is burned out, its very high impedance to reverse bias current is reduced to substantially zero.

In FIG. 4, resistors 130, 131, 132 and 133 of a first group are connected in parallel between terminals 140 and 141, each in series with a different one of resistors 134, 135, 136, and 137 of a second group. A fusible link of the first type employed in the embodiments of FIGS. 1 and 2 is connected directly in parallel with each resistor of the first group, such as link 143 in parallel with resistor 133. In that manner the resistance between terminals 140 and 141 is the equivalent of the second group of resistors 134 to 137 until selected fusible links are burned out by applying a positive voltage between terminal 141 and corresponding terminals 145 to 148 connected to an addressing bus in a manner similar to previous embodiments. The fusible links could, of course, be reverse biased junction diodes instead. In that case, adjustment of the total resistance between terminals 140 and 141 would be similar to the embodiments of FIGS. 1 and 2 but complementary thereto.

Although a standard fuse is illustrated for fusible links of the first type (which present an open circuit when burned out) and junction diodes for fusible links of the second type (which present a short circuit when burned out), it should be understood that any device having either of those characteristics may be employed as a fusible link to practice the present invention. Thus, although particular embodiments of the invention have been described and illustrated herein with specific devices, it is recognized that modifications and variations may readily occur to those skilled in the art, such as the use of capacitors, inductors or other circuit components to selectively define circuit parameters in place of the resistors. Consequently, it is intended that the claims be interpreted to cover such modifications and equivalents.

The embodiments of the invention in which an exclusive property or privilege is claimed are defined as follows:

1. In combination:

a threshold logic circuit having an electrically adjustable threshold reference level, said threshold logic circuit including an input summation network and a voltage source from which input signals to said summing network are derived, said threshold logic circuit also including a voltage divider connected across said source for establishing a predetermined threshold reference level having a constant proportionality relationship with respect to the summation result of said summation network with variations in the voltage level of said source, said voltage divider including a plurality of resistors and a plurality of electrically actuable fusible links interconnected so that the characteristics of said voltage divider and thus the value of said threshold reference level are dependent upon the number of fusible links which are actuated, said threshold logic circuit further including comparing means for comparing the summation result of said summation network with said threshold reference level and providing an output indication responsive thereto, and selective addressing means coupled to said fusible links so as to permit selectively applying actuating current thereto, said selective addressing means including a first addressing bus commonly coupled to one end of all of said fusible links and a plurality of additional addressing busses respectively coupled to the other ends of said fusible links so that actuation of a fusible link is obtained by energizing said first addressing bus and the respective one of said additional addressing busses corresponding thereto, said selective addressing means also including a plurality of decoupling diodes connected so that an actuating current is applicable to each fusible link only through at least one of said diodes.

2. The invention in accordance with claim 1, wherein a predetermined group of resistors of said voltage divider are in parallel, wherein each resistor of the group has a fusible link in series therewith, wherein one end of each of the fusible links is commonly connected to said first addressing bus, and wherein the other ends of said fusible links are connected to respective ones of the additional addressing busses via a respective one of said diodes.

3. The combination in accordance with claim 1, wherein a plurality of like threshold logic circuits and selective addressing means are provided, and wherein connecting means are provided for connecting respective ones of said additional addressing busses of said input addressing means.

* * * * *